US008750239B1

(12) United States Patent
Martini (10) Patent No.: US 8,750,239 B1
(45) Date of Patent: Jun. 10, 2014

(54) ALLOCATING A POOL OF SHARED BANDWIDTH

(71) Applicant: iboss, Inc., San Diego, CA (US)

(72) Inventor: Paul Michael Martini, San Diego, CA (US)

(73) Assignee: iboss Inc., San Diego, CA (US)

( * ) Notice: Subject to any disclaimer, the term of this patent is extended or adjusted under 35 U.S.C. 154(b) by 0 days.

(21) Appl. No.: 13/865,920

(22) Filed: Apr. 18, 2013

(51) Int. Cl.
*H04W 4/00* (2009.01)
*H04J 3/16* (2006.01)

(52) U.S. Cl.
USPC ............ 370/329; 370/338; 370/341; 370/437

(58) Field of Classification Search
None
See application file for complete search history.

(56) References Cited

U.S. PATENT DOCUMENTS

| | | | | |
|---|---|---|---|---|
| 2009/0316660 | A1* | 12/2009 | Perkins et al. | 370/332 |
| 2011/0082785 | A1* | 4/2011 | Weller et al. | 705/37 |
| 2012/0044817 | A1* | 2/2012 | Harper et al. | 370/252 |
| 2012/0054344 | A1* | 3/2012 | Udani et al. | 709/226 |
| 2012/0307654 | A1* | 12/2012 | Pantos et al. | 370/252 |
| 2013/0091278 | A1* | 4/2013 | Ludwig et al. | 709/224 |
| 2013/0114426 | A1* | 5/2013 | Polk et al. | 370/252 |

OTHER PUBLICATIONS

'charlesproxy.com' [online]. "Web Debugging Proxy Application for Windows, Mac OS and Linux," 2013, [retrieved on Apr. 26, 2013]. Retrieved from the Internet: <http://www.charlesproxy.com/documentation/proxying/throttling/>. 1 page.
'docs.trendmicro.com' [online]. "Limit User Bandwidth Totals," 2011, [retrieved on Apr. 26, 2013]. Retrieved from the Internet: <http://docs.trendmicro.com/all/ent/iwsva/v5.5/en-us/iwsva_5.5_olh/limit_user_bandwidth.htm>. 1 page.
'msdn.microsoft.com' [online]. "Group Policies," 2013 (Build date—2012), [retrieved on Apr. 26, 2013]. Retrieved from the Internet: <http://msdn.microsoft.com/en-us/library/windows/desktop/aa362844%28v=vs.85%29.aspx>. 6 pages.
'msdn.microsoft.com' [online]. "Network Bandwith," 2013 (Build date—2012), [retrieved on Apr. 26, 2013]. Retrieved from the Internet: <http://www.microsoft.com/en-us/library/windows/desktop/aa363133%28v=vs.85%29.aspx>. 2 pages.
'Rhinosoft.com' [online]. "Bandwidth Throttling ("Bandwidth Limitations") in Serv-U," 2003-2013, [retrieved on Apr. 26, 2013]. Retrieved from the Internet: URL<http://www.rhinosoft.com/Knowledgebase/KBArticle.asp?RefNo=1589&prod=fv>. 2 pages.

(Continued)

*Primary Examiner* — Chi Pham
*Assistant Examiner* — Soon-Dong D Hyun
(74) *Attorney, Agent, or Firm* — Fish & Richardson P.C.

(57) ABSTRACT

Methods, systems, and apparatus, including computer programs encoded on computer storage media, for allocating a pool of shared Internet bandwidth. One of the methods includes providing a first communications channel having a first bandwidth, the first bandwidth being shared by a first group of first users, providing a second communications channel having a second bandwidth different than the first bandwidth, the second bandwidth being shared by a second group of second users, detecting that at least one first data connection for a particular first user in the first group has satisfied a first predetermined condition, and moving, based on the detecting, the at least one first data connection for the particular first user from the first communications channel to the second communications channel.

27 Claims, 4 Drawing Sheets

(56) References Cited

OTHER PUBLICATIONS

'support.mozy.com' [online]. "Bandwidth Throttling," 2013, [retrieved on Apr. 26, 2013]. Retrieved from the Internet: <http://support.mozy.com/articles/en_US/documentation/mozypro-client-config-bandwidth-a-en>. 1 page.

'Wikipedia.org' [online]. "Bandwidth throttling," 2013, [retrieved on Apr. 26, 2013]. Retrieved from the Internet: URL<https://en.wikipedia.org/wiki/Bandwidth_throttling>. 6 pages.

\* cited by examiner

ALLOCATING A POOL OF SHARED BANDWIDTH

TECHNICAL FIELD

This specification relates to systems and techniques that facilitate the automatic allocation of a pool of shared network bandwidth, for example, for dynamically placing user devices or data connections into the pool of shared network bandwidth when a user device or a data connection violates one or more policies.

BACKGROUND

A computer network is a collection of computers and network hardware interconnected by communications channels that allow the computers and network hardware to create data connections across the communications channels and share data. The communications channels may be physically embodied in one or more wires, such as coaxial cables or fiber-optic cables, which connect the computers and network hardware, or the communications channels may be embodied using wireless communications protocols.

Data shared between computers may include documents, videos, and webpages, such as webpages for news websites or social networking websites. The data may allow users of the computers to collaborate on various projects or share information.

SUMMARY

In general, one aspect of the subject matter described in this specification can be embodied in methods that include the actions of providing a first communications channel having a first bandwidth, the first bandwidth being shared by a first group of first users, providing a second communications channel having a second bandwidth different than the first bandwidth, the second bandwidth being shared by a second group of second users, detecting that at least one first data connection for a particular first user in the first group has satisfied a first predetermined condition, and moving, based on the detecting, the at least one first data connection for the particular first user from the first communications channel to the second communications channel. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. The second bandwidth may be smaller or greater than the first bandwidth.

In some implementations, the detecting includes determining a first bandwidth usage of the at least one first data connection for the particular first user, comparing the first bandwidth usage with a threshold level of bandwidth usage, and detecting, based on the first bandwidth usage being greater than the threshold level of bandwidth usage, that the at least one first data connection for the particular first user has satisfied the first predetermined condition. The first bandwidth usage of the at least one first data connection for the particular first user may be determined over a predetermined duration of time. The first bandwidth usage of the at least one first data connection for the particular first user may be a first peak bandwidth usage of the at least one first data connection.

In some implementations, the detecting includes determining that at least one of the at least one first data connection for the particular first user has accessed one or more restricted resources. The determining may include determining that the at least one first data connection for the particular first user has accessed the restricted resources more than a predetermined quantity of instances.

In some implementations, the method includes detecting that at least one second data connection for the particular first user in the second group has satisfied a second predetermined condition, and moving, based on the detecting that the at least one second data connection for the particular first user has satisfied the second predetermined condition, the at least one second data connection for the particular first user from the second communications channel to the first communications channel. The detecting that the at least one second data connection for the particular first user has satisfied the second predetermined condition may include determining a first bandwidth usage of the at least one second data connection for the particular first user, comparing the first bandwidth usage with a threshold level of bandwidth usage, and detecting, based on the first bandwidth usage not being greater than the threshold level of bandwidth usage, that the at least one second data connection for the particular first user has satisfied the second predetermined condition. The first bandwidth usage of the at least one second data connection for the particular first user may be determined over a predetermined duration of time. The detecting that the at least one second data connection for the particular first user has satisfied the second predetermined condition may include determining that a predetermined duration of time has passed since the moving of the first data connections from the first communication channel to the second communications channel. The detecting that the at least one second data connection for the particular first user has satisfied the second predetermined condition may include determining that the at least one second data connection for the particular first user has not accessed one or more restricted resources for a predetermined duration of time.

In implementations where the at least one first data connection comprises two or more data connections within the first communications channel including a second data connection and a third data connection, the detecting may include determining a first bandwidth usage for the second data connection, comparing the first bandwidth usage with a threshold level of bandwidth usage, and detecting, based on the first bandwidth usage being greater than the threshold level of bandwidth usage, that the second data connection has satisfied the first predetermined condition. The moving may include moving the second data connection from the first communications channel to the second communications channel while the third data connection remains in the first communications channel.

In some implementations, the second communications channel shares the same physical connection in the data processing apparatus as the first communications channel. The method may include determining, for each of the first users, a bandwidth usage of the first communications channel, determining a total level of bandwidth usage of the first communications channel based on the bandwidth usage of the first communications channel for each of the first users, and adjusting a maximum bandwidth of the second communications channel based on the total level of bandwidth usage of the first communications channel.

The subject matter described in this specification may be implemented in various implementations to realize one or more of the following potential advantages. In some implementations, a network administrator may more easily allocate a restricted bandwidth pool for high network bandwidth users. In some implementations, data connections sharing a restricted bandwidth pool potentially have a greater maximum bandwidth than if each of the data connections separately had an assigned maximum bandwidth. In some implementations, the data connections sharing a restricted bandwidth pool are removed from a normal network bandwidth pool allowing other connections in the normal bandwidth pool to have higher bandwidth. In some implementations, data connections in the normal bandwidth pool may have further bandwidth policies applied without the restricted data connections influencing those policies. In certain implementations, a restricted bandwidth pool may have a higher bandwidth capacity than a normal bandwidth pool providing data connections moved to the higher bandwidth pool more bandwidth than the normal bandwidth pool.

Details of one or more implementations are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

In some network environments, often a small number of users consume a disproportionately or otherwise undesirably large amount of the available network bandwidth, thereby potentially degrading network performance for other users of the network. To prevent a user from consuming more than his or her fair share of network bandwidth, when the user is determined to have consumed more than a threshold amount of bandwidth for a predetermined period of time, the user can be placed in a modified bandwidth group, either indefinitely or for a predetermined period of time. The modified bandwidth group may be collectively limited to (i.e., shares among them) a restricted, maximum bandwidth that is less than an amount of bandwidth collectively available to network users not part of the modified bandwidth group, and which determines the maximum combined bandwidth usage of all the users in the restricted bandwidth group. Alternatively, the restricted, maximum bandwidth for modified bandwidth group may be greater than an amount of bandwidth collectively available to network users not part of the modified bandwidth group. As a result, users in the modified bandwidth group are prevented from consuming, on a collective basis, more than the maximum bandwidth allotted to the modified bandwidth group.

Figure 1:
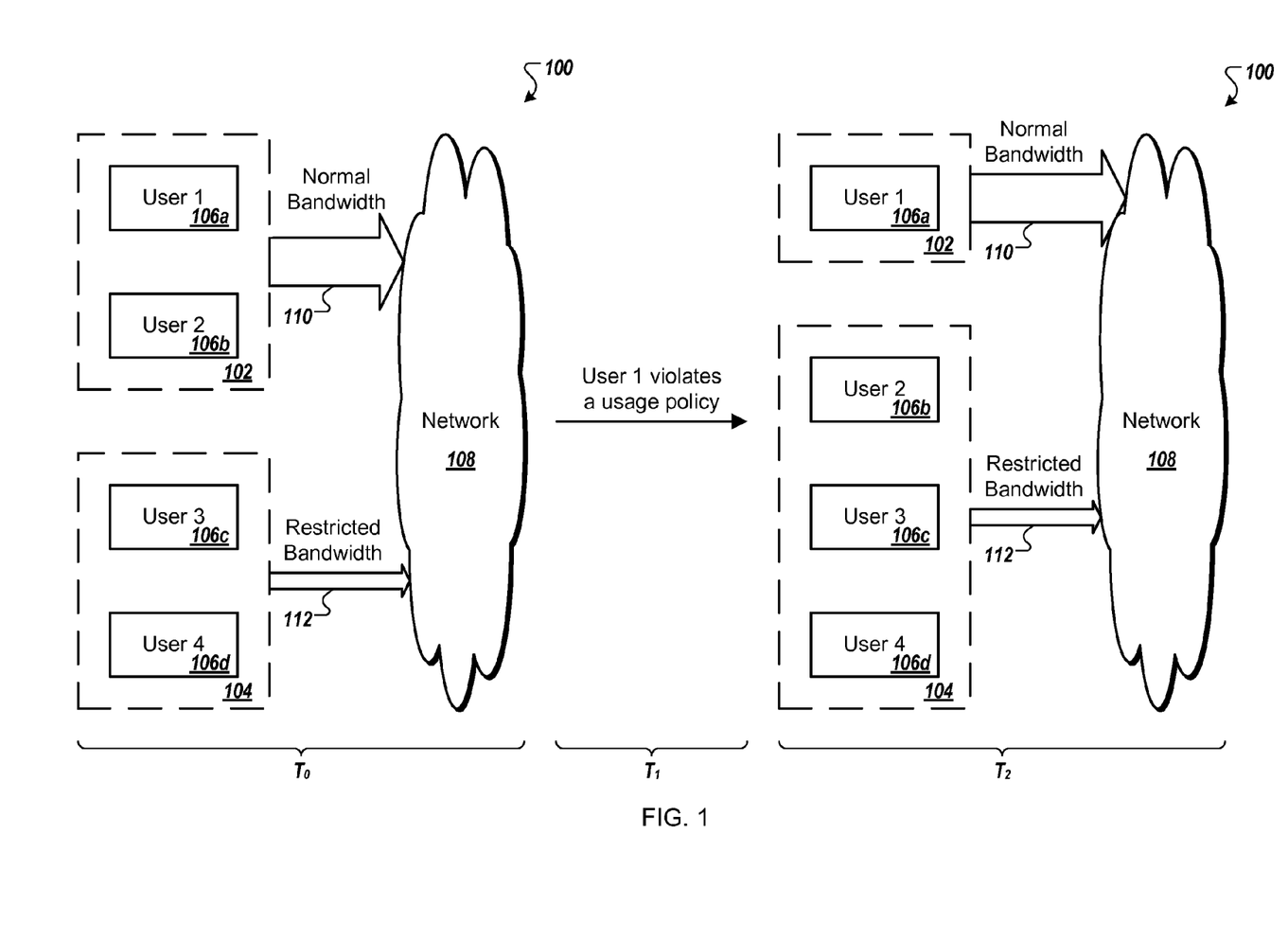
FIG. 1 is an example of a network system configured to move a user device from a normal bandwidth group to a restricted bandwidth group.

FIG. 1 is an example of a network system 100 that is configured to detect when a user has used more than a threshold amount of bandwidth, and upon so detecting, to move that user device from a normal bandwidth group 102 (i.e., a group of network users having access to the full bandwidth provided by the network administrator) to a restricted bandwidth group 104 (i.e., a group of one or more network users limited to a reduced amount of bandwidth to be shared among the users in the restricted bandwidth group). The network system 100 includes a plurality of user devices 106a-b that access a network 108 using a normal bandwidth communications channel 110, and potentially one or more user devices 106c-d that access the network 108 using a restricted bandwidth communications channel 112.

When a user device 106b first connects to the network 108 at time $T_0$, the user device 106b is placed in the normal bandwidth group 102 and allowed to use the normal (i.e., full bandwidth) communications channel 110. The normal bandwidth communications channel 110 does not restrict the bandwidth available to the user device 106b when accessing the network 108, other than any hardware or network access plan (e.g., an internet plan) restrictions that are associated with the user device 106b and/or the normal bandwidth communications channel 110.

Each of the user devices in the normal bandwidth group 102 may exceed an average bandwidth usage threshold for any arbitrary period of time less than a predetermined period of time without being placed in the restricted bandwidth group 104. For example, when the average bandwidth usage threshold is 2 Mbit/sec and the predetermined period of time is 1 minute, the user device 106b can use an average bandwidth of 5.6 Mbit/sec for 17 seconds and an average bandwidth of 0.2 Mbit/sec for the next consecutive 43 seconds for a total average bandwidth usage of 1.73 Mbit/sec over the 1 minute duration without being placed in the restricted bandwidth group 104.

When the network system 100 determines at time $T_1$ that the user device 106b has violated a usage policy, the user device 106b is placed in the restricted bandwidth group 104 at time $T_2$, essentially immediately upon detection of the usage policy violation. For example, the network system 100 may determine that the user device 106b exceeded the average bandwidth usage threshold for more than the predetermined period of time and place the user device 106b in the restricted bandwidth group 104.

The restricted bandwidth group 104 is limited to, on a collective basis, a maximum bandwidth usage limit for the restricted bandwidth communications channel 112. The network system 100 prevents the total bandwidth used by all of the user devices in the restricted bandwidth group 104 from exceeding the maximum bandwidth usage limit. For example, if the maximum bandwidth usage limit is 3 Mbit/sec, the combined bandwidth usage of the user devices 106b-d cannot exceed the 3 Mbit/sec limit. In one example, for a certain period of time, the user device 106b has an average bandwidth usage of 1.2 Mbit/sec, the user device 106c has an average bandwidth usage of 0.5 Mbit/sec, and the user device 106d has an average bandwidth usage of 1.3 Mbit/sec, where the actual bandwidth used by each of the user devices 106b-d varies continuously during the period of time.

Continuing the example, when the bandwidth of the user device 106b drops to 0.7 Mbit/sec from 1.2 Mbit/sec at a particular time and the network system 100 determines that the user device 106c could use more than 0.5 Mbit/sec of bandwidth at that particular time, the network system 100 increases the bandwidth available to the user device 106c while maintaining the maximum bandwidth usage limit, allowing the bandwidth used by the user device 106c to increase to a maximum of 1.0 Mbit/sec. If the user device 106b later requests additional bandwidth from the network system 100, and the network system 100 determines that the maximum bandwidth usage limit has been reached, based on the bandwidths of 0.7 Mbit/sec, 1.0 Mbit/sec, and 1.3 Mbit/sec of the user devices 106b-d respectively, the network system 100 prevents the user device 106b from being allocated more than 0.7 Mbit/sec of bandwidth to ensure that the bandwidth of the restricted bandwidth communications channel 112 does not exceed the maximum bandwidth usage limit. When the network system 100 determines that the bandwidth used by one of the other user devices in the restricted bandwidth group 104 decreases and that the user device 106b still requires additional bandwidth, the network system 100 may then allocate the user device 106b with additional bandwidth depending on the bandwidth requirements of the user devices in the restricted bandwidth group 104 (e.g., if another user device requires additional bandwidth) while maintaining the maximum bandwidth usage limit.

Figure 2:
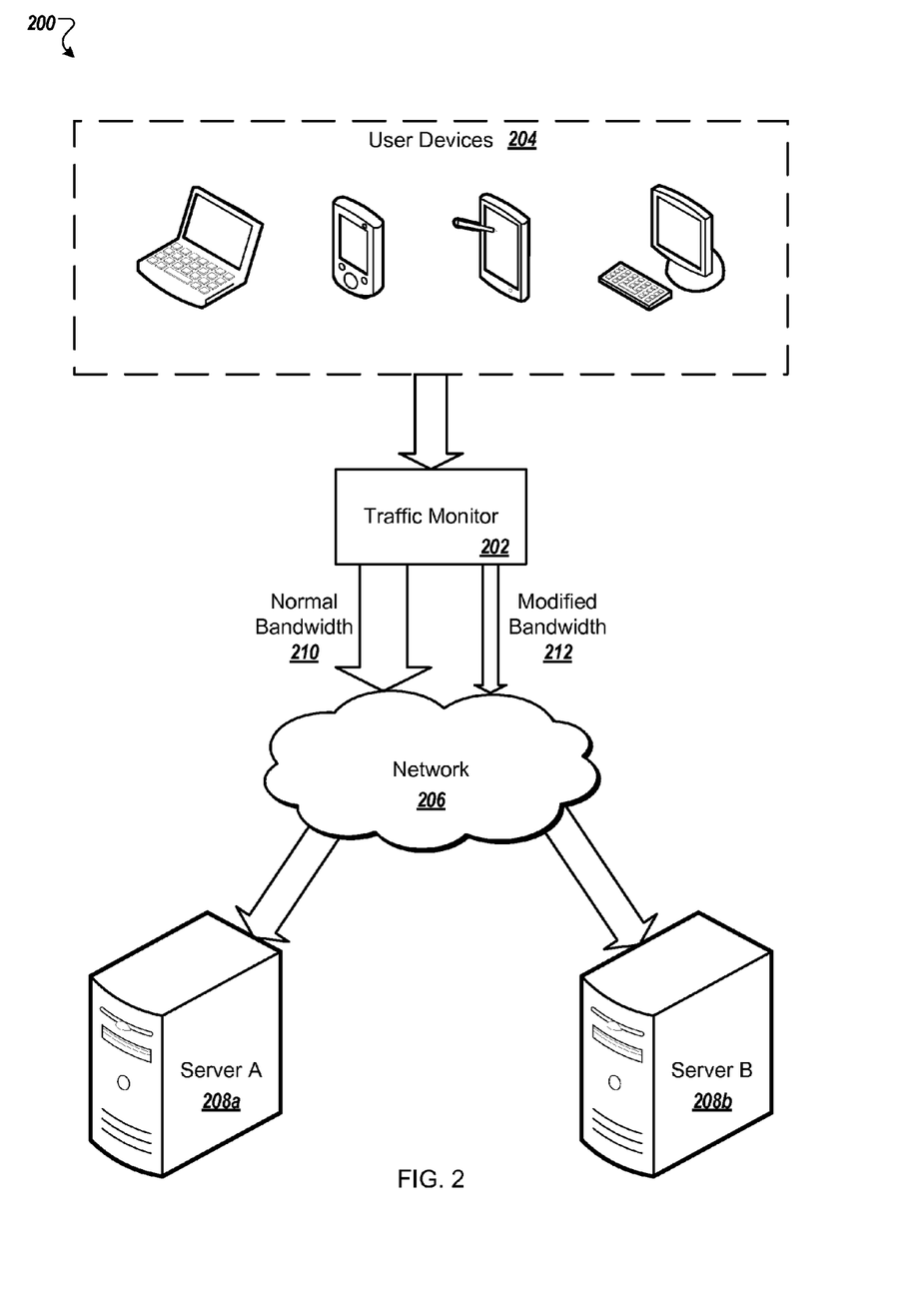
FIG. 2 is a block diagram of an environment in which a traffic monitor controls the network bandwidth available to each of a plurality of user devices when the user devices access a network.

FIG. 2 is a block diagram of an environment 200 in which a traffic monitor 202 controls the network bandwidth available to each of a plurality of user devices 204 when the user devices 204 access a network 206. The user devices 204 create data connections with one or more servers 208a-b using the network 206, and the traffic monitor 202 determines with which communications channel each of the data connections is associated.

The environment 200 includes a normal bandwidth communications channel 210 and a modified bandwidth communications channel 212 that provide the user devices 204 with different amounts of bandwidth for data connections to the servers 208a-b. For example, a first user device 204 may request a first data connection with the server 208a and the traffic monitor 202 places the first data connection in the normal bandwidth communications channel 210 based on one or more policies associated with the traffic monitor 202.

When the traffic monitor 202 determines that the first data connection has violated a predetermined policy (e.g., relating to volume of bandwidth usage, attempted access to a restricted resource, etc.), the traffic monitor 202 places the first data connection in the modified bandwidth communications channel 212. The traffic monitor 202, which may be located in the same local area network as the first user device 204, may determine that the server 208a is a restricted resource as defined by the predetermined policy, that the first data connection should not be allowed normal bandwidth access to the server 208a, and places the first data connection in the modified bandwidth communications channel 212. The server 208a may be a restricted resource based on the content provided by the server 208a (e.g., video streaming, adult content, etc.) or based on the type of connection between the first user device 204 and the server 208a (e.g., the first user device 204 connects to the server 208a across the Internet), to name a few examples.

The modified bandwidth communications channel 212 may have either a higher or a lower bandwidth throughput than the normal bandwidth communications channel 210. For example, when the modified bandwidth communications channel 212 is a restricted bandwidth communications channel with a lower maximum bandwidth than the normal bandwidth communications channel 210, a user device may be placed in the restricted bandwidth group to prevent the user device from consuming more than its fair share of network bandwidth or to prevent access to restricted resources. Alternatively, when the modified bandwidth communications channel 212 is a higher bandwidth communications channel with a higher maximum bandwidth than that normal bandwidth communications channel 210, a user device may be placed in the higher bandwidth group to provide the user device with additional bandwidth.

In some implementations, the traffic monitor 202 restricts the first device from accessing the server 208a based on the quantity of connections between the first user device 204 and restricted resources, such as the server 208a, over a predetermined period of time. For example, when a policy indicates that user devices should not access external websites more than four times a month and the traffic monitor 202 determines that the first user device 204 accessed one or more external websites, including a website hosted by the server 208a, five times in a single month, the traffic monitor 202 places the first data connection in the modified bandwidth communications channel 212.

In this example, based on design and implementation preferences, the traffic monitor 202 may or may not place other data connections for the first user device 204 in the modified bandwidth communications channel 210 where those other data connections access local network resources, such as the server 208b, when the server 208b is located on the same local network as the traffic monitor 202 and the first user device 204. The traffic monitor 202 places the local data connections in the normal bandwidth communications channel 210 and the first data connection is placed in the modified bandwidth communications channel 212. In an implementation, anytime the first user device 204, while in the modified bandwidth group, creates a new data connection for a resource external to the local network while bandwidth restrictions are in place for external connections for the first user device, the traffic monitor 202 places the new data connection in the modified bandwidth communications channel 212. Alternatively, when the traffic monitor 202 moves the first data connection to the modified bandwidth communications channel 212, a new data connection initiated by the first user device 204 may be placed initially in the normal bandwidth communications channel 210 and not moved to the modified bandwidth communications channel 212, if at all, until the new data connection is determined to have violated a policy that warrants the connection being moved to the modified bandwidth communications channel 212.

In an implementation, if a second user device 204 creates a second data connection to the server 208a while external data connections for the first user device 204 are placed in the modified bandwidth communications channel 212, the traffic monitor 202 determines whether to place the second data connection in the normal bandwidth communications channel 210 or the modified bandwidth communications channel 212 based on the usage and policies associated with the second user device and not the first user device. Alternatively, if the first and second user devices are determined to be logged into the network with the same user credentials, the traffic monitor 202 determines whether to place the second data connection in the normal bandwidth communications channel 210 or the modified bandwidth communications channel 212 based on which channel (i.e., normal versus modified) the first data connection currently resides, and/or the cumulative bandwidth usage of the first and second data connections together.

In some implementations, the traffic monitor 202 places all data connections associated with a single user device in the same communications channel. For example, when the traffic monitor 202 determines that one or more data connections for the first user device 204 violate a policy, all of the data connections for the first user device 204 that access the network 206 are placed in the modified bandwidth communications channel 212. In one example, when the combined bandwidth of all the data connections for the first user device 204 exceed a threshold average bandwidth usage for a predetermined period of time, all of the data connections for the first user device 204 are placed in the modified bandwidth communications channel 212. In this example, when the first user device 204 creates a new data connection, and the old data connections for the first user device 204 are in the modified bandwidth communications channel 212, the new data connection is placed in the modified bandwidth communications channel 212.

In some implementations, the traffic monitor 202 associates users with groups. For example, the traffic monitor 202 places both a user device and an associated user in the modified bandwidth group. In these implementations, when a specific user is in the modified bandwidth group and is associated with multiple user devices (e.g., both a laptop and a desktop physically located at the user's residence), all of the user's devices are placed in the modified bandwidth group. Alternatively, the traffic monitor 202 may place each of the user's devices in a group based on whether the specific device violates one or more policies.

In some implementations, the traffic monitor 202 places the first user device 204 in the modified bandwidth group based on a peak bandwidth associated with the first user device 204. For example, when the peak bandwidth of the first user device 204 exceeds a threshold peak bandwidth, the traffic monitor 202 places the first user device 204 in the modified bandwidth group.

In some implementations, the traffic monitor 202 places a user device in the modified bandwidth group for a predetermined period of time. For example, upon determining that the user device violates a policy, the traffic monitor 202 places the user device in the modified bandwidth group for a predetermined period of time that may be specified in the policy or another policy and after the predetermined period of time the traffic monitor 202 places the user device in the normal bandwidth group.

In some implementations, when the traffic monitor 202 places the first user device 204 in the modified bandwidth group based on the first user device 204 accessing a restricted resource, the traffic monitor 202 determines whether or not the first user device 204 has accessed one or more restricted resources for a predetermined period of time. For example, when the traffic monitor 202 determines that none of the data connections for the first user device 204 has accessed a restricted resource for a predetermined period of time, the traffic monitor 202 places all data connections for the first user device 204 in the normal bandwidth communications channel 210.

In some implementations, the traffic monitor 202 moves a user device from the modified bandwidth group to the normal bandwidth group when the bandwidth usage of the user device is not greater than a threshold level of bandwidth usage over a predetermined period of time. For example, the traffic monitor 202 determines that the first user device 204, which is currently located in the modified bandwidth group, has an average bandwidth usage that is less than the threshold bandwidth usage for the predetermined period of time.

In some implementations, the traffic monitor 202 moves a user device from the modified bandwidth group to the normal bandwidth group when the traffic monitor 202 determines that the user device complies with one or more policies over a predetermined period of time. For example, the traffic monitor 202 determines that the first user device 204, which is currently located in the modified bandwidth group, exceeded a threshold bandwidth usage only during off peak hours and the traffic monitor 202 places the first user device 204 in the normal bandwidth group.

In some implementations, the normal bandwidth communications channel 210 shares the same physical connection in the environment 200 as the modified bandwidth communications channel 212. For example, the traffic monitor 202 is connected to the network 206 with an optical cable and both the normal bandwidth communications channel 210 and the modified bandwidth communications channel 212 use the optical cable.

In some implementations, the environment 200 includes three or more communications channels. For example, the traffic monitor 202 uses a normal bandwidth communications channel for user devices that have not exceeded any average bandwidth usage threshold, a first modified bandwidth communications channel for user devices that have exceeded a first average bandwidth usage threshold, and a second modified bandwidth communications channel for user devices that have exceeded a second average bandwidth usage threshold. In implementations where the modified bandwidth communications channels are restricted bandwidth communications channels, the first modified bandwidth communications channel has more available bandwidth than the second modified bandwidth communications channel and the first average bandwidth usage threshold is less than the second average bandwidth usage threshold. For example, a first group of user devices that use the least amount of bandwidth are associated with the normal bandwidth communications channel, a second group of user devices that use the most bandwidth are associated with the second modified bandwidth communications channel (e.g., with the least bandwidth), and the remaining user devices are associated with the first modified bandwidth communications channel.

In some implementations, one or more policies specify an average upload bandwidth usage threshold and an average download bandwidth usage threshold. For example, the environment 200 may include three communications channels, a normal bandwidth communications channel, a modified upload communications channel, and a modified download communications channel, and the traffic monitor 202 places data connections in the communications channels based on the bandwidth usage of the respective data connection, where the modified upload communications channel is associated with a maximum upload bandwidth and the modified download communications channel is associated with a maximum download bandwidth. Alternatively, the modified bandwidth communications channel 212 is associated with both a maximum upload bandwidth and a maximum download bandwidth and when the traffic monitor 202 determines that a data connection exceeds either an average upload bandwidth threshold or an average download bandwidth threshold, the traffic monitor places the data connection in the modified bandwidth communications channel 212.

In some implementations, when the modified bandwidth communications channel 212 has a higher bandwidth than the normal bandwidth communications channel 210, the restricted resources may require a higher bandwidth than non-restricted resources or may be resources associated with a same company or business as the user devices 204. For example, when a user device is located at a company and requests access to a company resource, which is connected to either a local or a remote network, the traffic monitor 202 determines that the requested resource is associated with the company and places a data connection associated with the request in the higher bandwidth communications channel.

In some implementations, the traffic monitor 202 is located on a separate network from the user devices 204. For example, the first user device 204 connects to the traffic monitor 202 using the Internet. Here the traffic monitor 202 may restrict the bandwidth of the first user device 204 or data connections for the first user device based on the type of the first user device or an IP address for the first user device. For example, based on one or more policies, the traffic monitor 202 determines in which group to place the first user device.

In one example, when a firewall is located between the traffic monitor 202 and the first user device 204, a first data connection between the first user device 204 and the server 208a is placed in a restricted bandwidth communications channel and the traffic monitor 202 places a data connection between the server 208a and a third user device, that is behind the firewall with the traffic monitor 202, in the normal bandwidth communications channel 210.

The user devices 204 may include personal computers, mobile communication devices, and other devices that can send and receive data over the network 206. The network 206, such as a local area network (LAN), wide area network (WAN), the Internet, or a combination thereof, connects the user devices 204 and the servers 208a-b.

Figure 3:
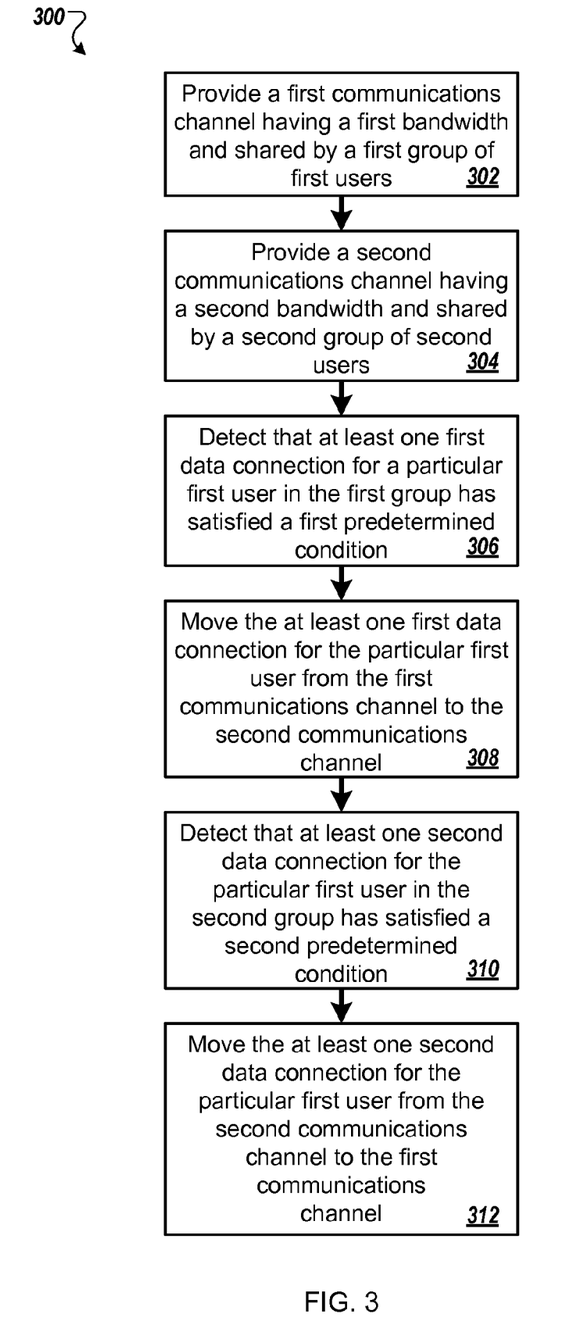
FIG. 3 is a flow diagram of a process for moving data connections between communications channels.

FIG. 3 is a flow diagram of a process 300 for moving data connections or user devices between communications channels. The process 300 can be used by the traffic monitor 202 from the environment 200.

The traffic monitor provides a first communications channel having a first bandwidth and shared by a first group of first users (302). For example, the first group of users includes a plurality of users and, as the devices associated with the users connect to the traffic monitor, the traffic monitor places the users and the associated user devices in the normal bandwidth group. Alternatively, the traffic monitors places either the user devices or the users in the normal bandwidth group but not both.

The traffic monitor provides a second communications channel having a second bandwidth and shared by a second group of second users (304). For example, the traffic monitor determines whether two or more user devices previously violated one or more policies and, if so, places the two or more user devices and the respective users in the modified bandwidth group. When the traffic monitor determines that only one user device previously violated a policy, the traffic monitor imposes a bandwidth cap on that user device and the modified bandwidth group does not include any user devices or associated users.

In some implementations, the second bandwidth is smaller than the first bandwidth. For example, the policies define restrictions on a maximum bandwidth associated with a user device, and when the user device exceeds the maximum bandwidth, the user device is placed in the second group.

In other implementations, the second bandwidth is larger than the first bandwidth. For example, the second communications channel has a higher bandwidth capacity than the first communications channel and provides data connections moved to the second communications channel with more bandwidth. When the traffic monitor determines that a user device requires more bandwidth than is available to the user device while in the first group (e.g., based on the bandwidth usage of other user devices in the first group), the traffic monitor places the user device in the second group.

The traffic monitor detects that at least one first data connection for a particular first user in the first group has satisfied a first predetermined condition (306). For example, the traffic monitor determines a first bandwidth usage of the at least one first data connection for the particular first user, compares the first bandwidth usage with a first threshold level of bandwidth usage, and determines that the at least one first data connection for the particular first user has satisfied the first predetermined condition when the first bandwidth usage is greater than the first threshold level of bandwidth usage.

The traffic monitor moves the at least one first data connection for the particular first user from the first communications channel to the second communications channel (308). For example, the traffic monitor moves the first data connection from the normal bandwidth communications channel to the modified bandwidth communications channel.

The traffic monitor detects that at least one second data connection for the particular first user in the second group has satisfied a second predetermined condition (310). For example, the traffic monitor determines a first bandwidth usage of the at least one second data connection for the particular first user, compares the first bandwidth usage with a second threshold level of bandwidth usage, potentially different from the first threshold level of bandwidth usage, and determines that the at least one second data connection for the particular first user has satisfied the second predetermined condition.

The at least one second data connection may include one or more of the data connections from the at least one first data connection. For example, the second data connection is the same as the first data connection.

Alternatively, the at least one second data connection does not include any data connections from the at least one first data connection. For example, when the particular first user is in the modified bandwidth group for a long period of time (e.g., multiple hours or days), the second data connection may be a different data connection from the first data connection.

The traffic monitor moves the at least one second data connection for the particular first user from the second communications channel to the first communications channel (312). For example, the traffic monitor moves the second data connection from the modified bandwidth communications channel to the normal bandwidth communications channel. The traffic monitor may leave at least one data connection for the particular first user in the modified bandwidth communications channel if the at least one data connection did not satisfy the second predetermined condition.

In one example, when the second communications channel is a higher bandwidth communications channel, the traffic monitor determines that the second data connection no longer requires a high bandwidth provided by the higher bandwidth communications channel and moves the second data connection from the higher bandwidth communications channel to the normal bandwidth communications channel.

The order of steps in the process 300 described above is illustrative only, and the moving of data connections between communications channels can be done in different orders. For example, the traffic monitor may move a particular second user from the second group to the first group and then move the particular second user from the first group back into the second group.

In some implementations, the process 300 can include additional steps, fewer steps, or some of the steps can be divided into multiple steps. For example, the traffic monitor may adjust the maximum bandwidth allocated to the second communications channel based on the bandwidth usage of the first communications channel. Here, the traffic monitor determines a bandwidth usage of the normal bandwidth communications channel for each of the user devices in the normal bandwidth group, and determines a total level of bandwidth usage for the normal bandwidth communications channel by combining the bandwidth usage of the normal bandwidth communications channel for each of the user devices in the normal bandwidth group. The traffic monitor adjusts the maximum bandwidth of the modified bandwidth communications channel based on the total level of bandwidth usage of the normal bandwidth communications channel.

For example, when both the normal bandwidth communications channel and the modified bandwidth communications channel share the same physical connection and the traffic monitor determines that the user devices in the normal bandwidth group are utilizing only fifty percent of the normal bandwidth communications channel, the traffic monitor may increase the maximum bandwidth allocated to the modified bandwidth communications channel.

Figure 4:
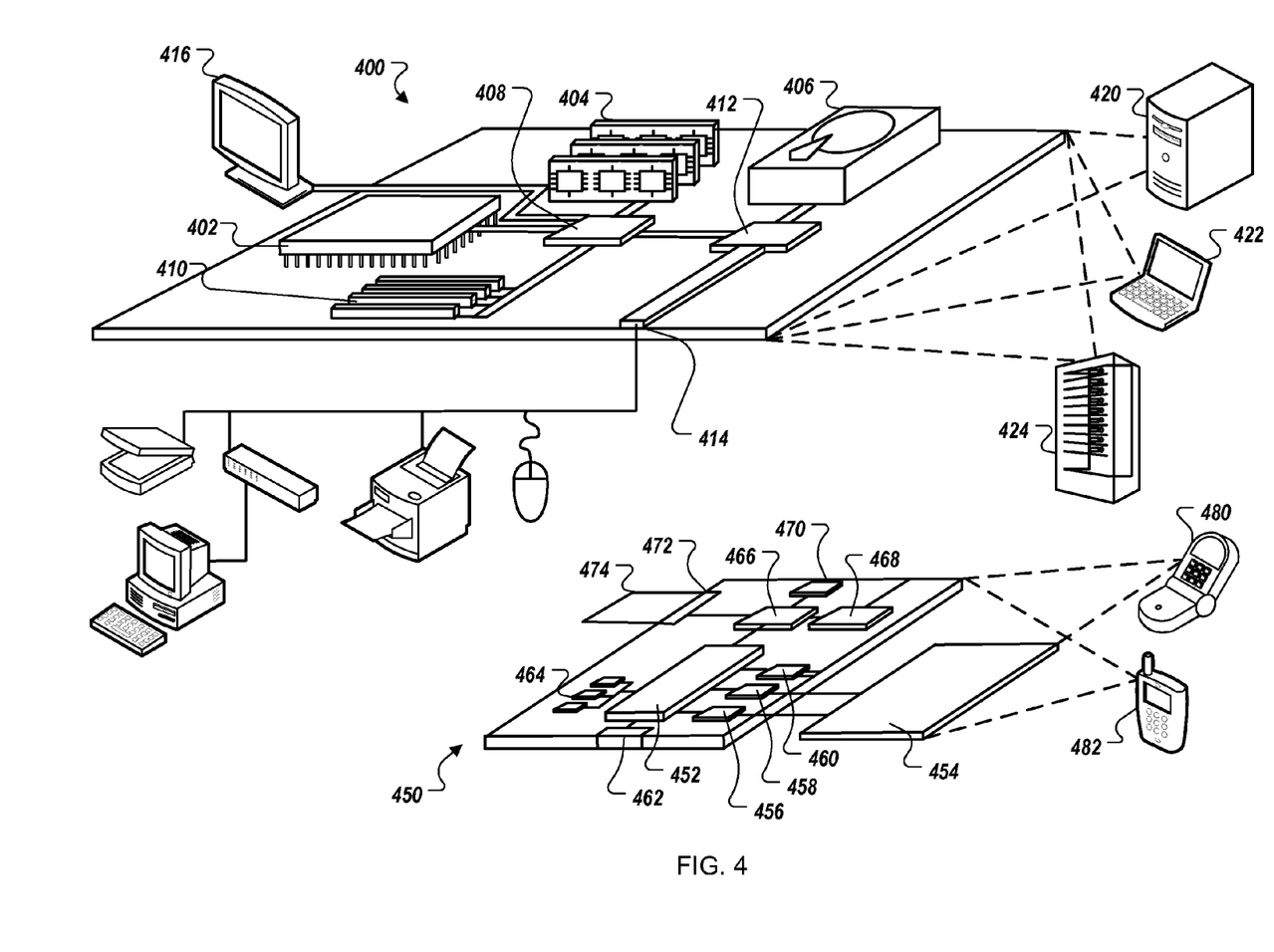
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high speed controller 408 is coupled to memory 404, display 416 (e.g., through a graphics processor or accelerator), and to high-speed expansion ports 410, which may accept various expansion cards (not shown). In the implementation, low speed controller 412 is coupled to storage device 406 and low speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 402 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
   providing a first communications channel having a first bandwidth, the first bandwidth being shared by a first group of first users;
   providing a second communications channel having a second bandwidth that is different than the first bandwidth, the second bandwidth being shared by a second group of second users;
   determining a first bandwidth usage of at least one first data connection for a particular first user;
   comparing the first bandwidth usage with a threshold level of bandwidth usage;
   determining, based on the first bandwidth usage being greater than the threshold level of bandwidth usage, that the at least one first data connection for the particular first user has satisfied a first predetermined condition; and
   moving, based on determining that the at least one first data connection for the particular first user has satisfied the first predetermined condition, at least one of the at least one first data connections for the particular first user from the first communications channel to the second communications channel.

2. The method of claim 1, wherein the second bandwidth is smaller than the first bandwidth.

3. The method of claim 1, further comprising:
   determining that at least one of the at least one first data connections for the particular first user has accessed one or more restricted resources, wherein moving the at least one of the at least one first data connections for the particular first user from the first communications channel to the second communications channel is based on determining that the at least one of the at least one first data connections for the particular first user has accessed one or more restricted resources.

4. The method of claim 1, further comprising:
   detecting that at least one second data connection for the particular first user in the second group has satisfied a second predetermined condition; and
   moving, based on the detecting that the at least one second data connection for the particular first user has satisfied the second predetermined condition, the at least one second data connection for the particular first user from the second communications channel to the first communications channel.

5. The method of claim 4, wherein the detecting that the at least one second data connection for the particular first user has satisfied the second predetermined condition comprises:
   determining a second bandwidth usage of the at least one second data connection for the particular first user;
   comparing the second bandwidth usage with a threshold level of bandwidth usage; and
   detecting, based on the second bandwidth usage not being greater than the threshold level of bandwidth usage, that the at least one second data connection for the particular first user has satisfied the second predetermined condition.

6. The method of claim 4, wherein the detecting that the at least one second data connection for the particular first user has satisfied the second predetermined condition comprises determining that a predetermined duration of time has passed since the moving of the at least one of the first data connections from the first communication channel to the second communications channel.

7. The method of claim 1, wherein:
   the at least one first data connection comprises two or more data connections within the first communications channel including a second data connection and a third data connection;
   determining the first bandwidth usage of the at least one first data connection for the particular first user further comprises determining a second bandwidth usage for the second data connection;
   comparing the first bandwidth usage with the threshold level of bandwidth usage further comprises comparing the second bandwidth usage with the threshold level of bandwidth usage;
   determining that the at least one first data connection for the particular first user has satisfied a first predetermined condition further comprises determining, based on the second bandwidth usage being greater than the threshold level of bandwidth usage, that the second data connection has satisfied the first predetermined condition; and
   moving the at least one of the at least one first data connection for the particular first user from the first communications channel to the second communications channel is based on determining that the second data connection has satisfied the first predetermined condition.

8. The method of claim 7, wherein the moving comprises:
   moving the second data connection from the first communications channel to the second communications channel while the third data connection remains in the first communications channel.

9. The method of claim 1, wherein the second communications channel shares the same physical connection in the data processing apparatus as the first communications channel, the method further comprising:
   determining, for each of the first users, a bandwidth usage of the first communications channel;
   determining a total level of bandwidth usage of the first communications channel based on the bandwidth usage of the first communications channel for each of the first users; and
   adjusting a maximum bandwidth of the second communications channel based on the total level of bandwidth usage of the first communications channel.

10. A non-transitory computer storage medium encoded with instructions that, when executed by one or more computers, cause the one or more computers to perform operations comprising:
    providing a first communications channel having a first bandwidth, the first bandwidth being shared by a first group of first users;
    providing a second communications channel having a second bandwidth that is different than the first bandwidth, the second bandwidth being shared by a second group of second users;
    determining a first bandwidth usage of at least one first data connection for a particular first user;
    comparing the first bandwidth usage with a threshold level of bandwidth usage;
    determining, based on the first bandwidth usage being greater than the threshold level of bandwidth usage, that the at least one first data connection for the particular first user has satisfied a first predetermined condition; and
    moving, based on determining that the at least one first data connection for the particular first user has satisfied the first predetermined condition, at least one of the at least one first data connections for the particular first user from the first communications channel to the second communications channel.

11. The computer storage medium of claim 10, wherein the second bandwidth is smaller than the first bandwidth.

12. The computer storage medium of claim 10, the operations further comprising:
    determining that at least one of the at least one first data connections for the particular first user has accessed one or more restricted resources, wherein moving the at least one of the at least one first data connections for the particular first user from the first communications channel to the second communications channel is based on determining that the at least one of the at least one first data connections for the particular first user has accessed one or more restricted resources.

13. The computer storage medium of claim 10, the operations further comprising:
    detecting that at least one second data connection for the particular first user in the second group has satisfied a second predetermined condition; and
    moving, based on the detecting that the at least one second data connection for the particular first user has satisfied the second predetermined condition, the at least one second data connection for the particular first user from the second communications channel to the first communications channel.

14. The computer storage medium of claim 13, wherein the detecting that the at least one second data connection for the particular first user has satisfied the second predetermined condition comprises:
    determining a second bandwidth usage of the at least one second data connection for the particular first user;
    comparing the second bandwidth usage with a threshold level of bandwidth usage; and
    detecting, based on the second bandwidth usage not being greater than the threshold level of bandwidth usage, that the at least one second data connection for the particular first user has satisfied the second predetermined condition.

15. The computer storage medium of claim 13, wherein the detecting that the at least one second data connection for the particular first user has satisfied the second predetermined condition comprises determining that a predetermined duration of time has passed since the moving of the at least one of the first data connections from the first communication channel to the second communications channel.

16. The computer storage medium of claim 10, wherein:
    the at least one first data connection comprises two or more data connections within the first communications channel including a second data connection and a third data connection;
    determining the first bandwidth usage of the at least one first data connection for the particular first user further comprises determining a second bandwidth usage for the second data connection;
    comparing the first bandwidth usage with the threshold level of bandwidth usage further comprises comparing the second bandwidth usage with the threshold level of bandwidth usage;
    determining that the at least one first data connection for the particular first user has satisfied a first predetermined condition further comprises determining, based on the second bandwidth usage being greater than the threshold level of bandwidth usage, that the second data connection has satisfied the first predetermined condition; and
    moving the at least one of the at least one first data connection for the particular first user from the first communications channel to the second communications channel is based on determining that the second data connection has satisfied the first predetermined condition.

17. The computer storage medium of claim 16, wherein the moving comprises:
    moving the second data connection from the first communications channel to the second communications channel while the third data connection remains in the first communications channel.

18. The computer storage medium of claim 17, the operations further comprising:
    determining, for each of the first users, a bandwidth usage of the first communications channel when the second communications channel shares the same physical connection as the first communications channel;
    determining a total level of bandwidth usage of the first communications channel based on the bandwidth usage of the first communications channel for each of the first users; and
    adjusting a maximum bandwidth of the second communications channel based on the total level of bandwidth usage of the first communications channel.

19. A system comprising:
    one or more computers and one or more storage devices storing instructions that are operable, when executed by the one or more computers, to cause the one or more computers to perform operations comprising:
        providing a first communications channel having a first bandwidth, the first bandwidth being shared by a first group of first users;
        providing a second communications channel having a second bandwidth that is different than the first bandwidth, the second bandwidth being shared by a second group of second users;
        determining a first bandwidth usage of at least one first data connection for a particular first user;
        comparing the first bandwidth usage with a threshold level of bandwidth usage;
        determining, based on the first bandwidth usage being greater than the threshold level of bandwidth usage, that the at least one first data connection for the particular first user has satisfied a first predetermined condition; and
        moving, based on determining that the at least one first data connection for the particular first user has satisfied the first predetermined condition, at least one of the at least one first data connections for the particular first user from the first communications channel to the second communications channel.

20. The system of claim 19, wherein the second bandwidth is smaller than the first bandwidth.

21. The system of claim 19, the operations further comprising:
    determining that at least one of the at least one first data connections for the particular first user has accessed one or more restricted resources, wherein moving the at least one of the at least one first data connections for the particular first user from the first communications channel to the second communications channel is based on determining that the at least one of the at least one first data connections for the particular first user has accessed one or more restricted resources.

22. The system of claim 19, the operations further comprising:

detecting that at least one second data connection for the particular first user in the second group has satisfied a second predetermined condition; and moving, based on the detecting that the at least one second data connection for the particular first user has satisfied the second predetermined condition, the at least one second data connection for the particular first user from the second communications channel to the first communications channel.

23. The system of claim 22, wherein the detecting that the at least one second data connection for the particular first user has satisfied the second predetermined condition comprises:

determining a second bandwidth usage of the at least one second data connection for the particular first user;

comparing the second bandwidth usage with a threshold level of bandwidth usage; and detecting, based on the second bandwidth usage not being greater than the threshold level of bandwidth usage, that the at least one second data connection for the particular first user has satisfied the second predetermined condition.

24. The system of claim 22, wherein the detecting that the at least one second data connection for the particular first user has satisfied the second predetermined condition comprises determining that a predetermined duration of time has passed since the moving of the at least one of the first data connections from the first communication channel to the second communications channel.

25. The system of claim 19, wherein:

the at least one first data connection comprises two or more data connections within the first communications channel including a second data connection and a third data connection;

determining the first bandwidth usage of the at least one first data connection for the particular first user further comprises determining a second bandwidth usage for the second data connection;

comparing the first bandwidth usage with the threshold level of bandwidth usage further comprises comparing the second bandwidth usage with the threshold level of bandwidth usage;

determining that the at least one first data connection for the particular first user has satisfied a first predetermined condition further comprises determining, based on the second bandwidth usage being greater than the threshold level of bandwidth usage, that the second data connection has satisfied the first predetermined condition; and moving the at least one of the at least one first data connection for the particular first user from the first communications channel to the second communications channel is based on determining that the second data connection has satisfied the first predetermined condition.

26. The system of claim 25, wherein the moving comprises:

moving the second data connection from the first communications channel to the second communications channel while the third data connection remains in the first communications channel.

27. The system of claim 19, wherein the second communications channel shares the same physical connection in the system as the first communications channel, the operations further comprising:

determining, for each of the first users, a bandwidth usage of the first communications channel;

determining a total level of bandwidth usage of the first communications channel based on the bandwidth usage of the first communications channel for each of the first users; and adjusting a maximum bandwidth of the second communications channel based on the total level of bandwidth usage of the first communications channel.

* * * * *